July 9, 1957
M. O'BRIEN ET AL
2,798,354
HEDGE TRIMMER
Filed Dec. 6, 1955
3 Sheets-Sheet 1
Fig. 1
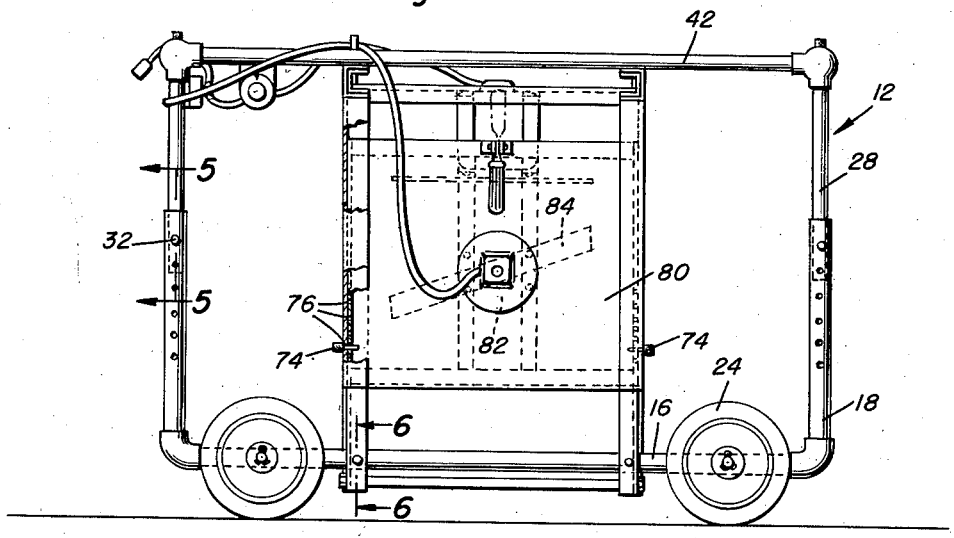
Fig. 2
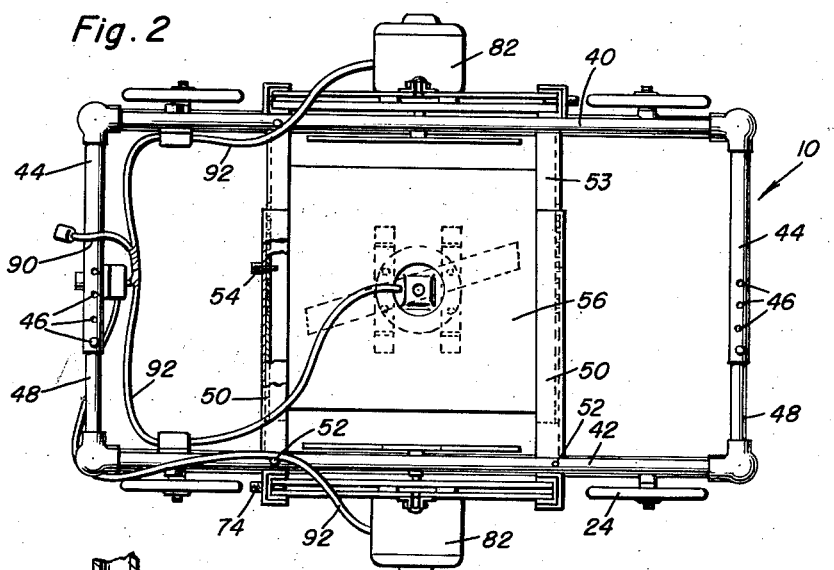
Fig. 5 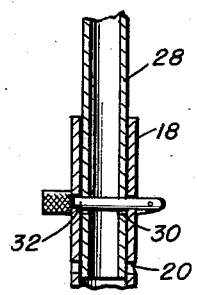 Fig. 6
Michael O'Brien
Joseph F. Batis
INVENTORS.
BY *Clarence A. O'Brien*
*and Harvey B. Jackson*
Attorneys July 9, 1957 M. O'BRIEN ET AL 2,798,354
HEDGE TRIMMER
Filed Dec. 6, 1955 3 Sheets-Sheet 2

Michael O'Brien
Joseph F. Batis
INVENTORS.

BY *Clarence A. O'Brien*
*and Harvey B. Jackson*
Attorneys

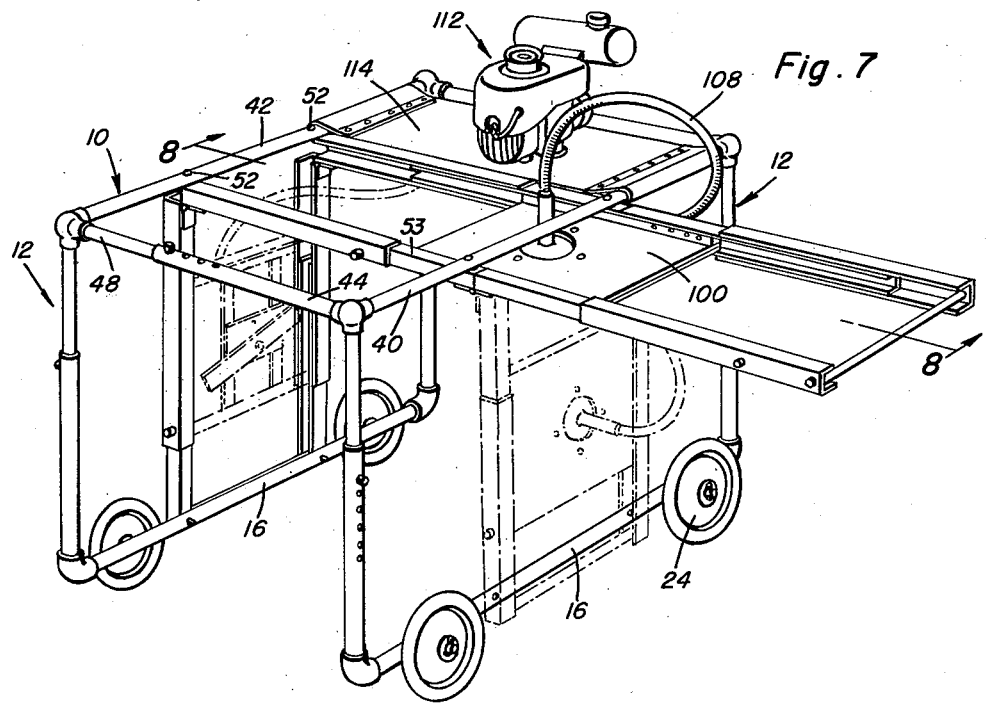
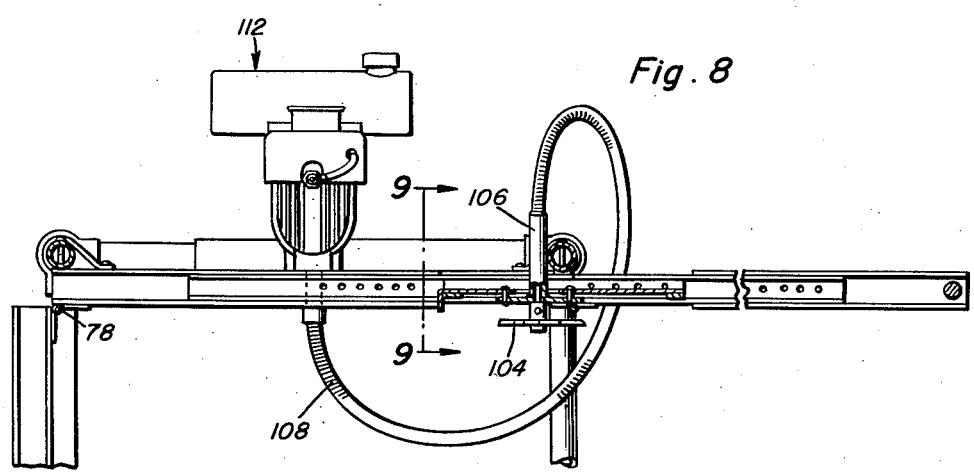
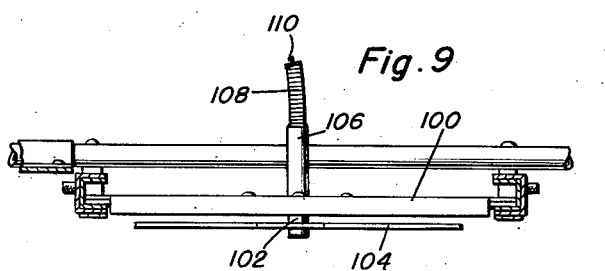

United States Patent Office 2,798,354
Patented July 9, 1957

2,798,354

HEDGE TRIMMER

Michael O'Brien and Joseph F. Batis, Masontown, Pa.

Application December 6, 1955, Serial No. 551,325

5 Claims. (Cl. 56—235)

This invention comprises novel and useful improvements in a hedge trimmer and more particularly relates to a mobile device adapted to straddle a hedge and be moved therealong for selectively and/or simultaneously trimming the top and sides of a hedge.

The primary object of this invention is to provide a hedge trimmer by which the top and sides or any one of these may be readily trimmed in any desired fashion, and whereby the apparatus may be easily adjusted to accommodate different heights and widths of hedges.

A further important object of the invention is to provide a hedge trimming apparatus in conformity with the preceding object and wherein there are provided a pair of hand track assemblies which are pivoted adjacent the ends of a top horizontal track assembly whereby the end assemblies may be selectively disposed in a vertical position or elevated into registration with the top track assembly in order that one or more cutter assemblies may be adjustably slid along the track assemblies for lateral adjustment of a hedge upon the top track assembly and one or more of the alignable end assemblies or may be disposed in an end assembly for vertical adjustment therein for trimming the side of a hedge.

A still further object of the invention is to provide a hedge trimming apparatus as set forth in the foregoing objects wherein a single power plant carried by the framework of the device may be connected by a flexible shaft to a rotary cutter whereby the source of power may be operatively connected with the cutter in various laterally or vertically adjusted positions of the latter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of an embodiment of a mobile hedge trimmer in accordance with this invention, parts being broken away and shown in section and certain concealed parts being shown in dotted lines therein;

Figure 2 is a top plan view of the arrangement of Figure 1, parts being shown in section and certain concealed parts being indicated in dotted lines therein;

Figures 5 and 6 are detailed views taken upon an enlarged scale substantially upon the planes indicated by the section lines 5—5 and 6—6, respectively, of Figure 1 and showing details of the vertical adjustment locking means and of the means for locking the leg assemblies in vertical position;

Figure 7 is a perspective view of a second embodiment in accordance with this invention, an alternative position of one of the leg assemblies being shown in dotted lines therein, and alternative positions of a single cutter assembly being indicated in dotted lines therein;

Figure 8 is a vertical transverse sectional view taken substantially upon the plane indicated by the section line 8—8 of Figure 7, parts being omitted; and, Figure 9 is a detailed view taken in vertical section substantially upon the plane indicated by the section line 9—9 of Figure 8.

Reference is made first to the embodiment of Figures 1–6 for an explanation, by way of illustrating the principles of the invention only, of a satisfactory embodiment apparatus in accordance with the invention.

Figure 3:
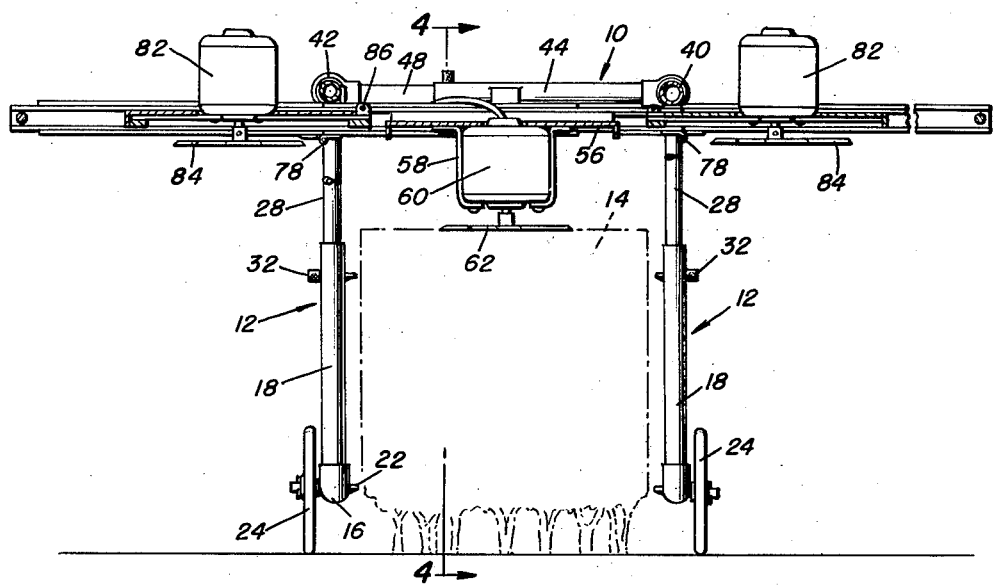
Figure 3 is an end view with parts broken away and shown in section of the arrangement of Figures 1 and 2, the end track assemblies being lifted into alignment with the horizontal top track assembly.

As shown in these figures, the apparatus is shown as consisting of a substantially U-shaped, inverted supporting framework, the same consisting of a top assembly indicated generally by the numeral 10, and which is connected to and extends transversely between the upper ends of a pair of substantially vertical leg assemblies 12. As shown in Figure 3, the U-shaped supporting frame is adapted to straddle a hedge, shown in phantom therein and indicated by the numeral 14, whereby the top and sides of the hedge may be trimmed to any desired height and width and in various shapes, while the device is moved along the hedge, as set forth hereinafter.

Each of the leg assemblies consists of upper and lower telescoping sections which are vertically adjustable. Thus, the lower section of each leg assembly consists of a horizontal member 16 having at its ends upstanding pipes 18, each of which is provided with a plurality of adjusting apertures 20. As shown more particularly in Figure 3, the horizontal member 16 is provided with stub axles 22 extending laterally outwardly therefrom, and carrying supporting wheels 24 thereon. By this means, the leg assemblies and consequently the U-shaped supporting frame are made mobile.

The upper section of each leg assembly is mounted upon upper horizontal members 40 and 42 having at their opposite ends a pair of depending tubular elements 28 whose lower ends are slidably received in the upstanding tubular members 18. As will be best apparent from Figure 5, the lower ends of the two members 28 of each leg assembly are provided with a diametrically disposed bore 30 and a transverse locking pin 32 is adapted to extend through the bore 30 and through a selected one of the set of apertures 20 in the member 18, whereby the upper section may be vertically adjusted and locked in adjusted position with respect to the lower section.

Referring next to Figure 2, it will be seen that the top assembly 10 also consists of a pair of laterally adjustable telescoping sections. Each of the laterally adjustable sections consists of the previously mentioned longitudinally extending members 40 and 42. The member 40 is provided with a pair of tubular parallel members 44 each provided with a plurality of adjusting apertures 46, while the member 42 is provided with a pair of members 48 which are telescopingly received in the ends of the members 44. The same type of fastening and locking means previously described is employed for locking the telescoping members 44 and 48 in laterally adjusted position.

As so far described, it will now be apparent that the inverted U-shaped frame may have its leg assemblies vertically lengthened whereby to position the top assembly at any desired elevation with respect to the hedge, while the top assembly may also be adjustably widened in order to vary the spacing of the leg assemblies to accommodate different widths of hedge.

Each of the top and leg assemblies has mounted thereon a track assembly by means of which cutting means of various types are mounted upon and adjustably carried by the apparatus. Referring first to the track assembly carried by the top assembly, attention being directed especially to Figures 2 and 4, it will be seen that the track assembly consists of a pair of telescoping and laterally adjustable channel-shaped rails. Each rail consists of a channel-shaped section 50 which is fixedly fastened as by bolts or the like 52 to the underside of the upper horizontal member 42, and extends laterally towards the other horizontal member 40. Telescopingly and slidingly received within the open end of channel member 50 is a channel member 53 which is similarly secured to the underside of the outer horizontal member 40. It will thus be apparent that as the two sections of the top assembly are adjusted towards or from each other, the sections 50, 53 of the track assembly carried thereby are also laterally adjusted, and a locking pin 54 cooperating with a plurality of longitudinally spaced slots in the telescoping rail sections 50 and 53 is employed to secure the track assembly in rigidly adjusted relation.

Slidably received within the telescoping rail sections 50 and 53 for movement transversely of the top assmbly is a carriage, slide or plate 56. Depending from this plate is a clamping or supporting means 58 by means of which an electric motor 60 is supported from which depends a horizontally rotating cutter 62. As so far described, it will be apparent that when the motor is energized, and the carriage 56 is moved transversely of the frame upon its telescoping track assembly, the cutter will trim the top of a hedge at an elevation depending upon the vertical adjustment of the leg assemblies and in a plane depending upon the transverse inclination of the track assembly.

Figure 4:
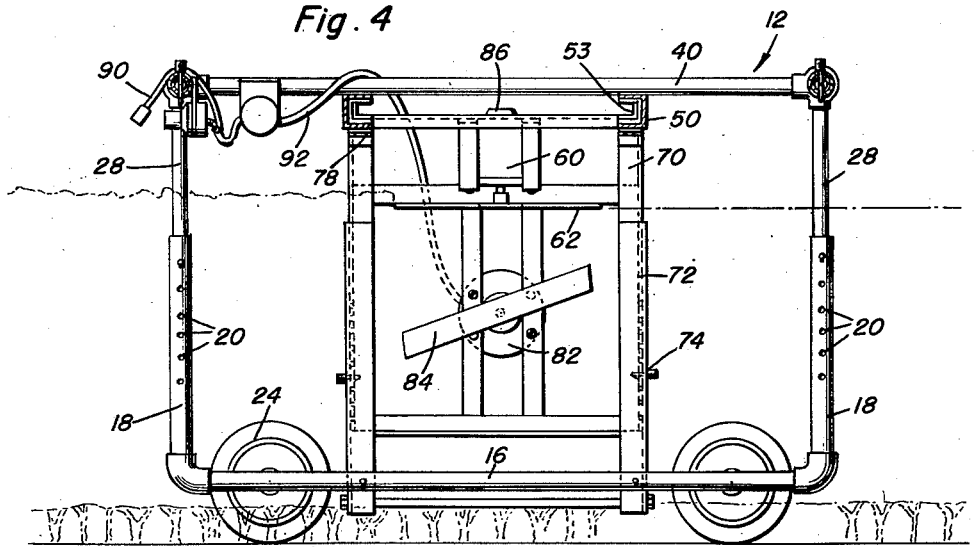
Figure 4 is a vertical longitudinal sectional view taken substantially upon the plane indicated by the section line 4—4 of Figure 3.

Referring now more especially to Figures 1, 4 and also to Figure 2, it will be seen that a track assembly is carried by each of the leg assemblies. Each track assembly of the leg assemblies also consists of a pair of vertically extending telescoping rails, each rail consisting of an upper channel-shaped member 70 and a lower channel-shaped member 72 telescopingly received and slidable upon the upper member 70. As in the previously described arrangements, the rail sections 70 and 72 may be secured in adjustably extended positions by means of locking pins 74 associated with registrable bores 76 provided in longitudinally spaced relation upon the telescoping rail sections.

At their upper ends, the upper telescoping rail sections 70 are hinged in any suitable manner as indicated generally at 78, see Figure 3, to the undersides of the rail sections 70 and 50, whereby the track assemblies of each of the leg assemblies may be swung vertically from the depending position shown in Figures 1, 2 and 4 to a raised or horizontal position shown in Figure 3 whereby the upper ends of the rail sections will be aligned with the extremities of the track assembly of the top assembly. It will be understood that although Figure 3 discloses both of the leg track assemblies raised into alignment with the top track assembly, that either of the leg assemblies may be raised and the other remain in lowered position, as desired.

Slidable in each of the leg track assemblies are carriages or slides 80 corresponding to carriage 56 of the top assembly, and each carrying an electric motor 82 with a cutter blade 84. As will now be understood, the carriages 80 may be vertically adjusted in the rails of the leg track assemblies by raising or lowering the same by means of handles 86, in order that the cutter blades of the leg assemblies may trim the hedge from top to bottom of the same. Further, when the leg track assemblies are raised to the horizontal or to any other desired inclination, the carriages 80 may be slid therealong to impart a sloping trimmed surface to the hedge as desired.

As shown best in Figure 2, current is supplied to the electric motors from any suitable source by a conductor 90 having branch conductors 92 to each of the electric motors.

From the foregoing, it will be apparent that in this form of the invention the device may be adjusted to simultaneously trim the top and sides of a hedge to any desired height and width and contour. Alternatively, one or more of the leg assemblies may be raised in order to laterally extend the cutting action of the apparatus, as suggested in Figure 3.

Attention is next directed to the modified construction of Figure 7. It will be observed that this arrangement is similar in principle to that of the preceding embodiment in that the inverted U-shaped frame is provided having the same top and leg assemblies 10 and 12, respectively, the construction being identical to that previously described. However, in this embodiment the cutter means consists of a single plate or carriage 100 which is selectively slidable in the tracks of the top or either leg assembly as desired. Journaled in this carriage and depending therefrom is a shaft 102 having a rotary cutting blade 104 extending therefrom. Rising from the plate 100 is a housing 106 in which the shaft 102 is journaled and which receives with a detachable connection one end of a flexible housing 108 in which is received a flexible driving cable 110 which is secured to the shaft 102 for rotating the latter. The other end of the flexible housing and flexible shaft are operatively connected in any desired manner to a suitable source of power such as a power plant indicated by the numeral 112. This power plant may comprise a gasoline engine as shown, but in some instances might consist of an electric motor if desired. As shown in Figure 7, a platform or support 114 is provided to which the power plant 112 is secured. The arrangement is such that the flexible driving means can be disconnected from the carriage, the latter may then be moved into either the top or one of the leg track assemblies when the tracks of the top and legs are horizontally aligned, and the flexible shaft may then be again connected. By this construction a single cutting means may be utilized to successively or selectively trim the sides and top of a hedge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile hedge trimmer comprising an inverted U-shaped supporting frame adapted to straddle a hedge and including a pair of laterally spaced leg assemblies open therebetween and joined together by a top assembly secured to and extending across the top thereof, cutting means for trimming the top and sides of a hedge mounted upon said frame, operating means supported on said frame and operatively connected to said cutting means for actuating the latter, means supporting said leg assemblies for travel along opposite sides of a hedge, means mounting said cutting means for slidable adjustment upon said frame, said top assembly including a pair of telescoping laterally adjustable sections, said cutting means being mounted upon said sections for horizontal movement thereon.

2. A mobile hedge trimmer comprising an inverted U-shaped supporting frame adapted to straddle a hedge and including a pair of laterally spaced leg assemblies open therebetween and joined together by a top assembly secured to and extending across the top thereof, cutting means for trimming the top and sides of a hedge mounted upon said frame, operating means supported on said frame and operatively connected to said cutting means for actuating the latter, means supporting said leg assemblies for travel along opposite sides of a hedge, means mounting said cutting means for slidable adjustment upon said frame, said mounting means including a plurality of tracks each mounted upon one of said assemblies, at least one slide movably mounted upon one of said tracks, said cutting means being supported by said slide.

3. A mobile hedge trimmer comprising an inverted U-shaped supporting frame adapted to straddle a hedge and including a pair of laterally spaced leg assemblies open therebetween and joined together by a top assembly secured to and extending across the top thereof, cutting means for trimming the top and sides of a hedge mounted upon said frame, operating means supported on said frame and operatively connected to said cutting means for actuating the latter, means supporting said leg assemblies for travel along opposite sides of a hedge, means mounting said cutting means for slidable adjustment upon said frame, said mounting means including a plurality of tracks each mounted upon one of said assemblies, at least one slide movably mounted upon one of said tracks, said cutting means being supported by said slide, the tracks mounted upon the leg assemblies being pivoted for tilting movement between a vertical position at the side of the leg assemblies and a substantially horizontal position in alignment with the track mounted upon the top assembly whereby said slide may be moved upon any of said tracks for selectively positioning said cutting means for trimming the top and sides of a hedge.

4. A mobile hedge trimmer comprising an inverted U-shaped supporting frame adapted to straddle a hedge and including a pair of laterally spaced leg assemblies open therebetween and joined together by a top assembly secured to and extending across the top thereof, cutting means for trimming the top and sides of a hedge mounted upon said frame, operating means supported on said frame and operatively connected to said cutting means for actuating the latter, means supporting said leg assemblies for travel along opposite sides of a hedge, means mounting said cutting means for slidable adjustment upon said frame, said cutting means including a rotary cutter, said operating means comprising a power plant stationarily mounted on said frame remote from the cutter, means connecting the latter to said cutter.

5. A mobile hedge trimmer comprising an inverted U-shaped supporting frame adapted to straddle a hedge and including a pair of laterally spaced leg assemblies open therebetween and joined together by a top assembly secured to and extending across the top thereof, cutting means for trimming the top and sides of a hedge mounted upon said frame, operating means supported on said frame and operatively connected to said cutting means for actuating the latter, means supporting said leg assemblies for travel along opposite sides of a hedge, means mounting said cutting means for slidable adjustment upon said frame, said cutting means including a rotary cutter, said operating means comprising a power plant stationarily mounted on said frame, means connecting the latter to said cutter, said connecting means comprising a flexible drive shaft having one end operatively connected to said power plant and its other end detachably coupled to said cutter.

References Cited in the file of this patent
UNITED STATES PATENTS

| | | |
|---|---|---|
| 1,227,105 | Barnes | May 22, 1917 |
| 1,869,394 | Sikma | Aug. 2, 1932 |